US00RE35778E

United States Patent [19]

Stirling et al.

[11] E Patent Number: Re. 35,778

[45] Reissued Date of Patent: Apr. 28, 1998

[54] STRUCTURE FOR RESURFACING BOWLING LANES

[75] Inventors: Michael F. Stirling, Spring Lake; Michael G. Gautraud, Muskegon; William C. Murphy, Fremont, all of Mich.

[73] Assignee: Brunswick Bowling & Billiards, Muskegon, Mich.

[21] Appl. No.: 190,799

[22] Filed: Jan. 28, 1994

Related U.S. Patent Documents

Reissue of:

[64] Patent No.: 5,084,318
Issued: Jan. 28, 1992
Appl. No.: 610,468
Filed: Nov. 8, 1990

U.S. Applications:

[63] Continuation of Ser. No. 280,947, Dec. 7, 1988, abandoned.

[51] Int. Cl.[6] ..... A63D 1/04; B32B 3/10

[52] U.S. Cl. ..... 428/63; 428/67; 428/99; 428/138; 428/195; 473/115; 473/117

[58] Field of Search ..... 428/63, 99, 138, 428/195, 67; 473/117, 115, 113

[56] References Cited

U.S. PATENT DOCUMENTS

| | | | |
|---|---|---|---|
| 2,039,580 | 5/1936 | Borders | 273/51 |
| 4,205,842 | 6/1980 | Murrey | 273/51 |
| 4,205,843 | 6/1980 | Murrey | 273/51 |

OTHER PUBLICATIONS

"Bowling Breakthrough," Plastics Design Forum, Mar. 1987, p. 42.

H. Gooden and N. Ricci, "Composite Replaces Wood in Bowling Lanes," Aug. 1987, pp. 80, 82, 96.

*Primary Examiner*—Alexander S. Thomas

*Attorney, Agent, or Firm*—Wood, Phillips, VanSanten, Clark & Mortimer

[57] ABSTRACT

An overlay structure is provided for resurfacing a bowling lane. The structure includes a relatively thick homogeneous laminate sheet having a print layer to simulate the appearance of a wood bowling lane. A plurality of mechanical fasteners are positioned in respective recesses in the upper surface of the sheet and extending through the sheet for securement to the lane. Plugs are force fit into the recesses to hide the mechanical fasteners. The plugs are fabricated similarly to and have the same appearance as the print layer of the sheet.

35 Claims, 2 Drawing Sheets

STRUCTURE FOR RESURFACING BOWLING LANES

Matter enclosed in heavy brackets [ ] appears in the original patent but forms no part of this reissue specification; matter printed in italics indicates the additions made by reissue.

This application is a *reissue of application No. 610,468, now U.S. Pat. No. 5,089,318, which is a* continuation of application Ser. No. 280,947, filed Dec. 7, 1988 abandoned.

FIELD OF THE INVENTION

This invention generally relates to the art of bowling lanes and, particularly, to a synthetic overlay structure for resurfacing a lane.

BACKGROUND OF THE INVENTION

A conventional bowling lane is fabricated of wood construction, of different species of wood depending upon the lane location. The lane is structured as a laminate with laminated strips of wood of substantial thickness extending lengthwise of the lane. Of course, during extended use, the surface of the wood lane becomes worn and irregular. Originally, wood lanes were resurfaced by sanding to restore the flat surface of the lane and refinishing. This procedure is time consuming and quite expensive and, because of the sanding procedure, an entire facility may have to be shut down when any one lane is resurfaced. To solve this problem, various attempts have been made to resurface a bowling lane by covering the lane with an overlay structure, usually a continuous homogeneous surface sheet extending the width of the lane.

For instance, thin laminates, on the order of 3/16 inch thick, have been used and simply glued to the surface of the existing lane. Such a laminate was too thin to afford a mechanical attachment and resulted in being too thin to withstand countless ball impacts during normal play.

Other attempts at solving the problem have included the use of a thick underlayment which can be mechanically attached to the existing lane, and then covering the thick underlayment with a thin synthetic laminate adhesively attached thereto. The relatively thick underlayment was fabricated of wood particle board, but these procedures proved to be quite expensive. Relatively thick aluminum underlayments have been used but they create undesirable sounds upon ball impact.

Another attempt has been to use a single, relatively thick, homogeneous fiberglass panel which simply is mechanically attached to the existing lane at the four corners of the panel. This resulted in the panels becoming uneven.

Still another attempt was to provide a factorymade, thin sandwich-type overlay structure and mechanically anchoring the structure to the lane at considerably spaced locations, such as on the order of four feet apart. The sandwich would include a particle board covered by a synthetic laminate made in the factory and taken to a cite for installation. Such sandwich structures would not stay flat and buckled between the anchoring locations.

A main concern with any type of mechanical attachment is the cosmetic consequences of the exposed mechanical means. In addition, the problems and dilemmas faced by lane designers, as exemplified above, are magnified when considering that a non-wood synthetic lane covering will respond to typical temperature and humidity changes differently from the wood lane it covers. Consequently, the synthetic covering must be firmly attached to the lane to either "move" with the lane, or to prevent the lane itself from moving significantly.

As can be seen from the above outline of various prior attempts at resurfacing bowling lanes, adhesives and/or closely spaced mechanical connections may accomplish these necessary results, except that adhesive attachment is quite expensive to perform, time consuming and generally presents an unhealthy environment, while mechanical fasteners or attaching means usually are cosmetically unacceptable.

This invention is directed to solving the above problems and satisfying the need for an improved covering for a bowling lane.

SUMMARY OF THE INVENTION

An object, therefore, of the invention is to provide a new and improved overlay structure for resurfacing a bowling lane.

Generally, the invention contemplates the use of a relatively thick, homogeneous laminate sheet. A plurality of mechanical fastening means are spaced about the perimeter of the sheet in respective recesses in the upper surface of the sheet and extending through the sheet for securement to the lane. Plug means fill the recesses flush with the upper surface of the sheet to hide the fastening means.

The laminate sheet should be greater than 3/16 inch thick and, preferably, approximately 7/16 inch thick.

This allows sufficient thickness for a fastener, such as a screw, to rigidly secure the sheet to the lane yet provide a recess for a filler plug. The recesses can be countersunk for receiving the heads of the screws. The filler plugs are forced into the recesses above the screw heads. Preferably, the filler plugs are fabricated of the same material as the laminate sheet and effectively hide the fastening means. The fastening means are spaced less than forty inches apart and, preferably, on the order of 10–20 inches apart.

The invention contemplates drilling the countersunk recesses and including a set of filler plugs having varying dimensions from which a plug for any given recess can be chosen. This compensates for any tolerances to insure a tight press fit for the filler plugs.

The laminate sheet includes a print layer to simulate the appearance of a wood bowling lane. At least one clear wear layer is provided over the print layer. The filler plugs are fabricated of similar material, also with a matching print layer.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
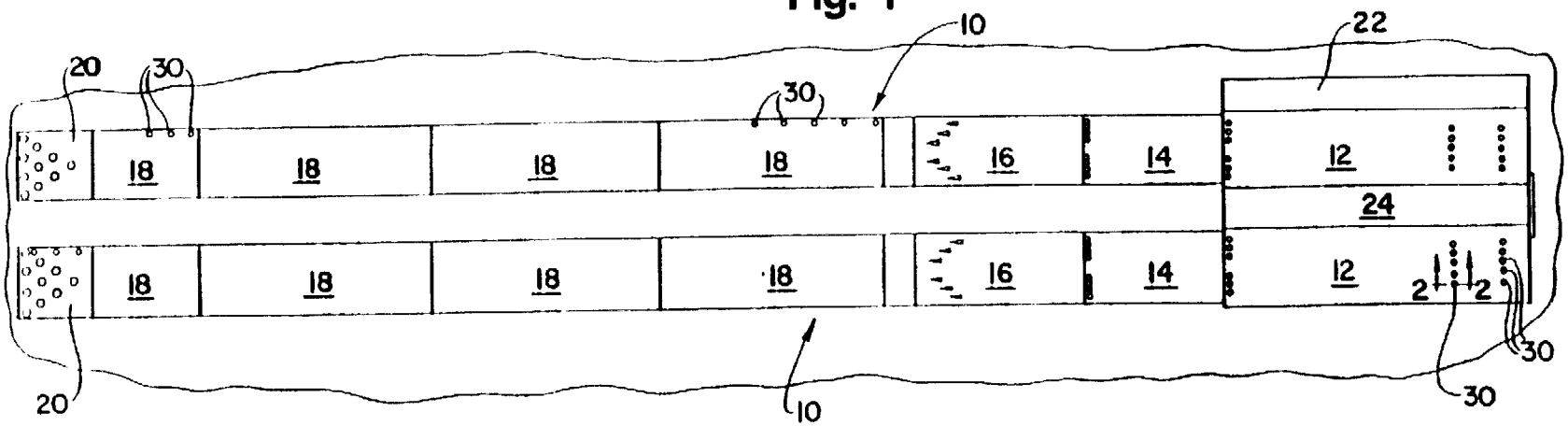
FIG. 1 is a top plan view of the layout of a conventional bowling lane having been resurfaced with an overlay structure according to the invention.

Referring to the drawings in greater detail, and first to FIG. 1, the layout of a pair of conventional bowling lanes is illustrated to show the various laminates that are employed lengthwise of the lane. Starting from right to left, as with a conventional bowling lane, each lane, generally designated 10, includes an "approach" section 12, a "foul line" section 14, a "head" section 16, four successive "pine face" sections 18 and a "pin deck" section 20. Each pair of lanes 10 is divided by a "division" section 22, and the lanes of each pair have a "return" section 24 therebetween. These sections and terminology are conventional in the art.

Historically, approach sections 12, foul line sections 14, head sections 16, pin deck section 20, division sections 22 and return sections 24 all are fabricated of maple wood. Of course, this is to provide a hard surface in the area of considerable wear. The pine face sections 18 are fabricated of pine wood. Consequently, when describing the print layer for the laminate sheets explained hereinafter, the print would correspond to these species of wood for an original bowling lane.

Figure 3:
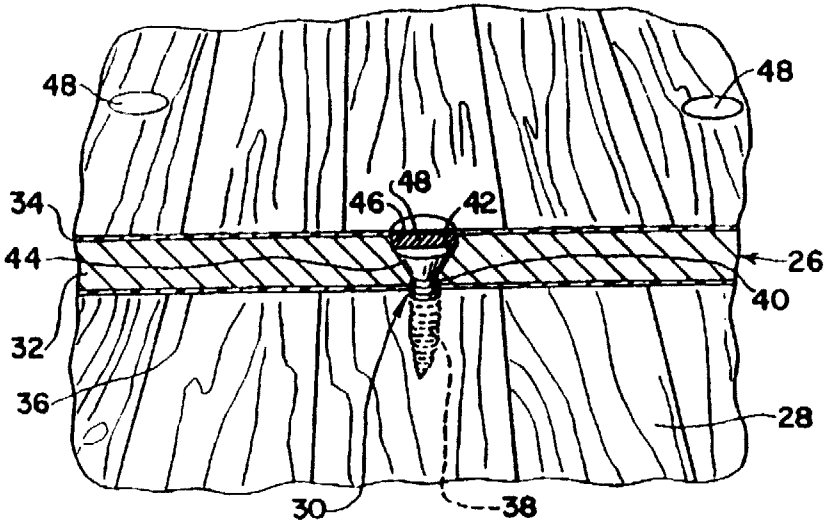
FIG. 3 is a perspective view, on a further enlarged scale, showing in greater detail the fastening means and overlay structure of the invention.
Figure 2:
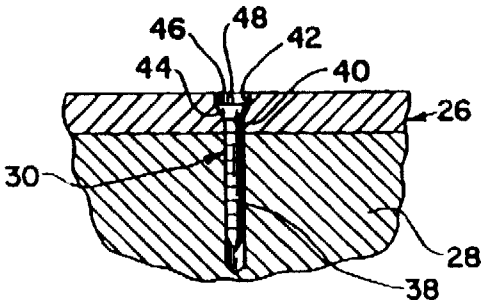
FIG. 2 is a fragmented section, on an enlarged scale, taken generally along line 2—2 of FIG. 1, through one of the mechanical fastening means of the invention.

Referring to FIGS. 2 and 3, the invention contemplates the use of an overlay structure, generally designated 26, for covering, i.e. resurfacing, an existing bowling lane 28, and including the use of a plurality of mechanical fastening means, generally designated 30.

More particularly, covering 26 is fabricated of a relatively thick, homogeneous laminate sheet 32 (FIG. 3) A print layer 34 covers sheet 32 to simulate the appearance of a wood bowling lane, depending upon the species of wood as described above. Print layer 34 then is covered by at least one clear wear layer which is not numbered in the drawings because of its thin and clear nature.

The majority of laminate sheet 32 is fabricated of a homogeneous material constructed with layers of phenol-formaldehyde impregnated Kraft paper 0.007 inch thickness per sheet. Sheet 32 should be greater than 3/16 inch thick and, preferably, on the order of 7/16 inch thick for accommodating mechanical fastening means 30 as described hereinafter. In relation to the screw fasteners described hereinafter, the sheet is on the order of three times the height of the head of one of the screws.

The orientation of the Kraft paper or plies should be "lengthwise" of the sheets or parallel to the direction of the bowling lane. In other words, the fibers which comprise the sheet should be oriented in a downlane direction.

Print layer 34 has been fabricated by a melamineformaldehyde impregnated alpha-cellulose 65# basis weight paper with cured thickness on the order of 0.006–0.008 inch. The print layer paper is pre-dried and tension-controlled during impregnation to minimize any sheet width variation.

The top clear wear layer or layers are provided for long wearing characteristics. For instance, the laminates which make up the "maple" sections (such as approach section 12, foul line section 14 and head ection 16), would include a plurality of clear wear layers. In practice, one layer of a 22 lb. low wear (non-aluminum oxide) melamineformaldehyde impregnated alpha-cellulose plus two layers of 22 lb. high wear (aluminum oxide impregnated) melamineformaldehyde impregnated alpha-cellulose have proven effective. The "pine" sections, such as "pine face" sections 18, may include two layers of 22 lb. high wear (aluminum oxide impregnated) melamine-formaldehyde impregnated alpha-cellulose.

Laminate sheet 32 is fabricated by a laminating process using extremely high pressures and temperatures to fuse or homogenize the multiple, resin saturated, layers together. The interior phenolic Kraft paper layers, print layer 34 and the wear layer(s) all are fused in a single process. All the layers (on the order of 60 in total) are individually resin soaked by running the sheets through a resin bath, and then dried before processing. They then are stacked to yield the desired final laminate thickness. Of course, the print layer is stacked on top of the Kraft paper layers, with the wear layer(s) on top of the print layer. Presses are loaded with multiple stacks, separated by mirror-like, polished platens to produce smooth finishes. High pressure (e.g. 1,000 psi) and high temperature (e.g. 300°) are applied to the multiple stacks for several hours and fully cured. The finished laminate sheet is truly a one piece homogeneous structure. The phenolic and melamine resins are compatible resins for this process; i.e. they cure at similar temperature and pressure. A bottom melamine layer 36 (FIG. 3) preferably is used for dimensional stability, in combination with melamine print layer 34.

The covering 26 is thus a one piece homogeneous plastic covering layer laminate sheet which consists of a top clear melamine wear layer, a melamine print layer 34, a phenolic laminate sheet 32 and a bottom melamine layer 36.

Mechanical fastening means 30 are in the form of screws 38 extending through covering 26 for securement to lane 28, as shown. The screws extend through drilled holes 40, the holes being countersunk, as at 42, to accommodate the heads 44 of the screws in recesses 46 in the upper surface of the sheet. After the screws are embedded to securely fix the sheet to the existing lane, a plurality of disc-shaped plugs 48 are inserted by a press fit into recesses 46 sufficient to be substantially flush with the upper surface of sheet 26. The plugs are fabricated similar to the laminate sheet, including a print layer to match the print layer of the sheet, but simply of a thinner construction.

The plugs provide an appearance which heretofore made mechanical fastening means unacceptable in the industry. The plugs allow the use of as many fasteners as desired to force the laminate to follow the contour of the existing lane and prevent the laminate from moving independently of the lane. The laminate also is prevented from moving independent of an adjoining laminate sheet. The use of numerous fasteners improves the sound affect of a bowling ball or pins impacting the lane, and adjoining sheets can be secured at very flush seams. In practice, 330 screw fasteners have been used on a single lane.

In order to compensate for tolerance variations between the drilled recesses 46 and the diameters of plugs 48, the invention contemplates providing a "set" of plugs for use during installation. For instance, the recesses may be formed with a 0.438 size drill. A set of plugs may include plugs having 0.445, 0.450 and 0.455 inch diameters. In addition, the depth of the countersunk portion 42 of each recess should be greater than the thickness of the plugs. This allows a plug to be pressed flush with the surface of the laminate sheet as opposed to bottoming out on a screw head or on the bottom ledge of the countersunk portion of the recess. This avoids the need for precision depths of the recess portions and precision thickness of the plugs. Therefore, if one plug is too small or too large for any given recess, this range or variation in plug sizes has proven in practice to afford a tight press fit for the plugs during most any installation procedure.

Figure 4:
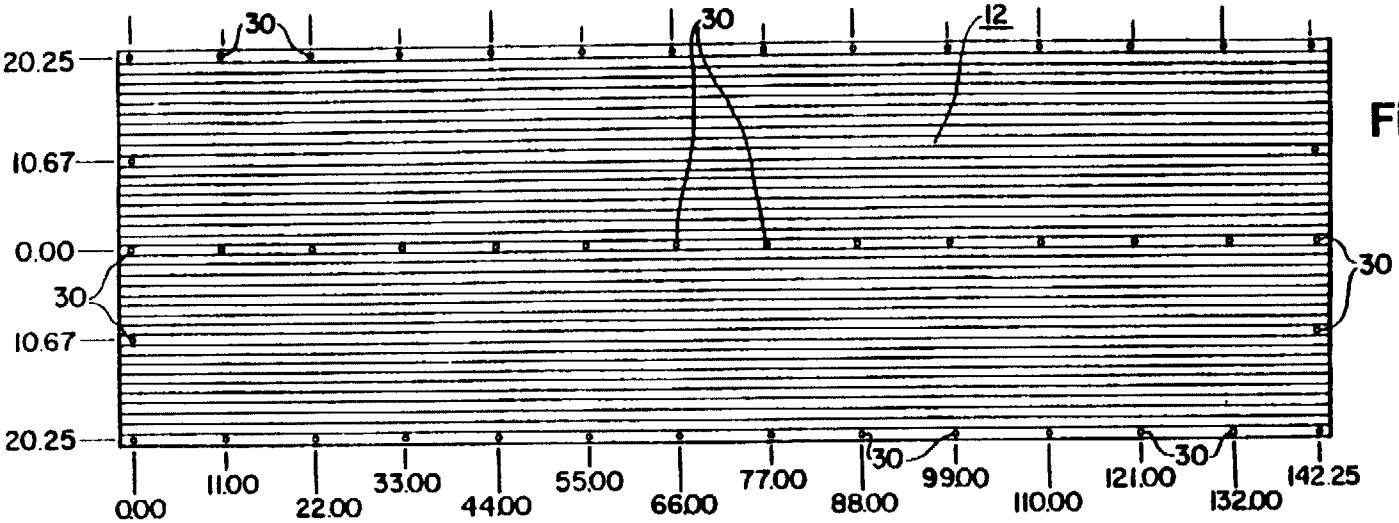
FIG. 4 is a top plan view of the "approach" laminate section of the bowling lane, illustrating the spacing of the fastening means.
Figure 5:
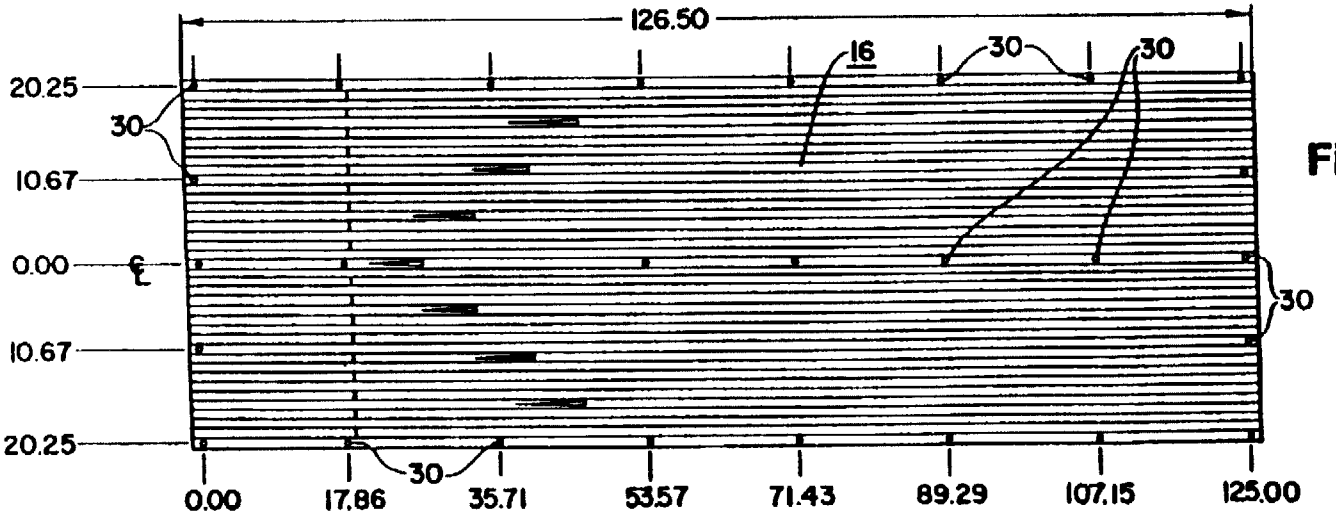
FIG. 5 is a view similar to that of FIG. 4, illustrating the spacing of the fastening means on the "head" laminate section of the bowling lane.

Except for the rows of fastening means 30 shown at the right of approach sections 12 in FIG. 1, the invention contemplates that fastening means or screws 30 and plugs 48 be spaced relatively close about the perimeter of the various lane sections and down a centerline of a given section. For instance, FIGS. 4 and 5 show approach section 12 and head section 16, respectively, in enlarged illustrations to illustrate the spacing and location of the fastening means. For instance, approach section 12 may be on the order of 143.75 inches long. Head section 16 may be on the order of 126.50 inches long. Generally, the fastening means are positioned approximately ¾ inch inwardly from the peripheries of the sheet panels. As a general concept, the fastening means are spaced approximately 20 inches apart from the foul line to the pin deck of the lane, and approximately 10 inches apart from the foul line to the approach of the lane. Thus, approach section 12 shown in FIG. 4 has fastening means 30 spaced 11 inches apart as illustrated by the numerical dimensions shown along the bottom edge of the sheet. The width of the sheet is divided accordingly, and it can be seen that the fastening means 30 along the left end of the sheet, again, are spaced approximately 10 inches apart. The same holds true for the dimensions illustrated in FIG. 5 for head section 16, wherein it can be seen that the fastening means 30 along the lengthwise edge of the sheet are spaced approximately 20 inches apart. In reality, the sheets for the respective lane sections are divided into equal spacings so that the distance between adjacent fastening means approach the 10 inch and 20 inch parameters. The fastening means at the ends of head section 16 are approximately 10 inches apart for uniformity of spacing for adjacent sheets running the entire length of the bowling lane.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An overlay structure for resurfacing an existing bowling lane, comprising:

a homogeneous, plastic covering [layer laminate] sheet having a print layer to simulate the appearance of a wood bowling lane and at least one clear wear layer over said print layer, the homogeneous [laminate] sheet being greater than 3/16 inch thick and defining an exposed surface of the bowling lane to resist denting from pin and bowling ball impact;

a plurality of mechanical fastening means in respective recesses in the upper surface of the homogeneous [laminate] sheet and extending through the homogeneous [laminate] sheet for securement to the lane; and plug means *sized to be inserted* in the recesses for hiding the mechanical fastening means, the plug means being fabricated of the same material as the homogenous [laminate] sheet.

2. The overlay structure of claim 1 wherein said [laminate] *homogeneous* sheet is [greater than] approximately 7/16 inch thick.

3. The overlay structure of claim 1 wherein said mechanical fastening means are spaced on the order of 10–20 inches apart.

4. The overlay structure of claim 1 wherein said mechanical fastening means comprise screw means.

5. The overlay structure of claim 4 wherein said recesses are countersunk for receiving heads of said screw means.

6. The overlay structure of claim 5 wherein said recesses are countersunk to a depth greater than the thickness of the plug means to prevent the plug means from bottoming out and allow the plug means to be flush with the upper surface of the sheet.

7. The overlay structure of claim 4 wherein the thickness of said [laminate] *homogeneous sheet* is on the order of three times the height of a head of one of the screw means.

8. The overlay structure of claim 1 wherein said plug means are *sized to be* force fit into the recesses.

9. The overlay structure of claim 1 wherein said plug means include a set of plugs having varying dimensions from which a plug for a given recess can be chosen.

10. An overlay structure for resurfacing an existing bowling lane, comprising:

a homogeneous plastic covering [layer laminate] sheet greater than 3/16 inch thick and defining an exposed surface of the bowling lane to resist denting from pin and bowling ball impact and having a print layer to simulate the appearance of a wood bowling lane and at least one clear wear layer over said print layer;

a plurality of screw fasteners in respective recesses in the upper surface of the homogeneous [laminate] sheet and extending through the homogeneous [laminate] sheet for securement of the lane;

said homogeneous [laminate] sheet being thicker than the height of a head of a screw fastener; and plug means *sized to be* force fit into the recesses for hiding the screw fasteners, the plug means being fabricated of the same material as the [laminate] *homogeneous* sheet.

11. The overlay structure of claim 10 wherein said [laminate] *homogeneous* sheet is approximately 7/16 inch thick.

12. The overlay structure of claim 10 wherein said [mechanical fastening means] *screw fasteners* are spaced on the order of 10–20 inches apart.

13. The overlay structure of claim 10 wherein said recesses are countersunk for receiving heads of said screw [means] *fasteners*.

14. The overlay structure of claim 13 wherein said recesses are countersunk to a depth greater than the thickness of the plug means to prevent the plug means from bottoming out and allow the plug means to be flush with the upper surface of the sheet.

15. The overlay structure of claim 10 wherein said plug means include a set of plugs having varying dimensions from which a plug for a given recess can be chosen.

16. The overlay structure of claim 10 wherein the thickness of said laminate is on the order of three times the height of a head of one of the screw [means] *fasteners*.

*17. A system for defining a bowling lane surface, said system comprising:*

*a covering sheet having a first layer, a print layer over the first layer, and a clear wear layer over the print layer,*

*said first, print, and clear wear layers united to define a homogeneous sheet having a thickness that is greater than 3/16 inch and defining an exposed upper surface of a bowling lane to resist denting from pin and bowling ball impact; and*

*a plurality of mechanical fastening means extending through the homogeneous sheet and into recesses*

*defined through the exposed upper surface and having a depth that is less than the thickness of the homogeneous sheet.*

*18. The system for defining a bowling lane surface according to claim 17 including plug means sized to be inserted in the recesses over the mechanical fastening means.*

*19. The system for defining a bowling lane surface according to claim 18 wherein said plug means are sized to be force fit into the recesses.*

*20. The system for defining a bowling lane surface according to claim 18 wherein said plug means comprise a set of plugs having different dimensions from which a plug of desired size for a given recess can be chosen.*

*21. The system for defining a bowling lane surface according to claim 18 wherein said plug means are fabricated from the same material as the homogeneous sheet.*

*22. The system for defining a bowling lane surface according to claim 17 wherein said homogeneous sheet has a thickness of approximately 7/16 inch.*

*23. The system for defining a bowling lane surface according to claim 17 wherein said plurality of mechanical fastening means are spaced from each other with said space being in the range of approximately 10 to 20 inches.*

*24. The system for defining a bowling lane surface according to claim 17 wherein said mechanical fastening means comprise screws.*

*25. The system for defining a bowling lane surface according to claim 24 wherein said recesses are pre-formed and countersunk for receiving heads of said screws.*

*26. The system for defining a bowling lane surface according to claim 25 wherein the depth of the recesses is greater than the thickness of the plug means to prevent the plug means from bottoming out and allow the plug means to be flush with the upper surface of the homogeneous sheet.*

*27. The system for defining a bowling lane surface according to claim 24 wherein the thickness of the homogeneous sheet is approximately three times the height of a head of one of the screws.*

*28. A system for defining a bowling lane surface, said system comprising:*

*covering sheet having a first layer, a print layer over the first layer, and a clear wear layer over the print layer,*

*said first, print, and clear wear layers united to define a homogeneous sheet having a thickness that is greater than 3/16 inch and defining an exposed upper surface of a bowling lane to resist denting from pin and bowling ball impact;*

*a plurality of recesses in said homogeneous sheet at said exposed upper surface having a depth that is less than the thickness of the homogeneous sheet; and*

*a plurality of mechanical fastening means in said plurality of recesses and extending through the homogeneous sheet.*

*29. The system for defining a bowling lane surface according to claim 28 including plug means sized to be inserted in the recesses for covering the mechanical fastening means.*

*30. The system for defining a bowling lane surface according to claim 29 wherein said plug means are sized to be force fit into the recesses.*

*31. The system for defining a bowling lane surface according to claim 29 wherein said plug means are fabricated from the same material as the homogeneous sheet.*

*32. The system for defining a bowling lane surface according to claim 28 wherein said homogeneous sheet has a thickness of approximately 7/16 inch.*

*33. The system for defining a bowling lane surface according to claim 28 wherein said mechanical fastening means comprise screws.*

*34. The system for defining a bowling lane surface according to claim 33 wherein said recesses are countersunk for receiving heads of said screws.*

*35. The system for defining a bowling lane surface according to claim 34 wherein the depth of the recesses is greater than the thickness of the plug means to prevent the plug means from bottoming out and allow the plug means to be flush with the upper surface of the homogeneous sheet.*

* * * * *